US012779474B2

(12) United States Patent
Borchard et al.

(10) Patent No.: US 12,779,474 B2
(45) Date of Patent: Nov. 3, 2026

(54) ACTIVE FIELD POLARIZED MEDIA AIR CLEANING DEVICE

(71) Applicant: HENGST SE, Münster (DE)

(72) Inventors: Andreas Borchard, Coesfeld (DE); Jürgen Efing, Dortmund (DE); Lars Petersen, Münster (DE)

(73) Assignee: HENGST SE, Münster (DE)

( * ) Notice: Subject to any disclaimer, the term of this patent is extended or adjusted under 35 U.S.C. 154(b) by 0 days.

(21) Appl. No.: 19/183,375

(22) Filed: Apr. 18, 2025

(65) Prior Publication Data

US 2025/0276329 A1 Sep. 4, 2025

Related U.S. Application Data

(63) Continuation of application No. PCT/EP2023/079021, filed on Oct. 18, 2023.

(30) Foreign Application Priority Data

Oct. 21, 2022 (EP) .................................... 22202915

(51) Int. Cl.
*B03C 3/155* (2006.01)
*B03C 3/09* (2006.01)
*B03C 3/66* (2006.01)

(52) U.S. Cl.
CPC ................ *B03C 3/155* (2013.01); *B03C 3/09* (2013.01); *B03C 3/66* (2013.01)

(58) Field of Classification Search
CPC .. B03C 3/155; B03C 3/41; B03C 3/47; B03C 3/08; B03C 3/68; B03C 3/09
See application file for complete search history.

(56) References Cited

U.S. PATENT DOCUMENTS 5,330,559 A * 7/1994 Cheney .................. B03C 3/155 96/99
5,474,599 A * 12/1995 Cheney .................. B03C 3/155 96/99

(Continued)

FOREIGN PATENT DOCUMENTS

CN 204816887 U 12/2015
CN 105983486 A 10/2016

(Continued)

OTHER PUBLICATIONS

European Patent Office, Extended Search Report, Application No. 22202915.9, Apr. 17, 2023, 11 pages.

(Continued)

*Primary Examiner* — Jennifer Dieterle
*Assistant Examiner* — Sonji Turner
(74) *Attorney, Agent, or Firm* — Quarles & Brady LLP; Yakov S. Sidorin

(57) ABSTRACT

A gas cleaning device includes a first electrode and a second electrode, a first filter medium with a first side and a second side such that the first side faces towards the first electrode and the second side faces towards the second electrode. The use of such device allows to combine in practice two cleaning methodologies—the Active Field Polarized Media Air Cleaning and the corona discharge air cleaning—if a (Continued)

corona discharge electrode is located at a distance from the first electrode while the first electrode is between the corona discharge electrode and the first filter medium.

20 Claims, 1 Drawing Sheet

(56) References Cited

U.S. PATENT DOCUMENTS

| | | | | |
|---|---|---|---|---|
| 5,549,735 | A | 8/1996 | Coppom | |
| 6,245,132 | B1 * | 6/2001 | Feldman | A61L 9/16 96/28 |
| 2003/0005824 | A1 | 1/2003 | Katou et al. | |
| 2005/0109204 | A1 * | 5/2005 | Coppom | B03C 3/155 96/66 |
| 2007/0199450 | A1 | 8/2007 | Wiser et al. | |
| 2008/0190772 | A1 * | 8/2008 | Greist | B03C 3/155 204/665 |
| 2010/0011959 | A1 * | 1/2010 | Marra | B03C 3/09 96/62 |
| 2011/0219954 | A1 * | 9/2011 | McKinney | B03C 3/025 96/55 |
| 2014/0102295 | A1 | 4/2014 | Mckinney | |
| 2018/0015481 | A1 | 1/2018 | Rothenberg | |
| 2019/0160475 | A1 * | 5/2019 | Cwik | B03C 3/41 |
| 2022/0168753 | A1 | 6/2022 | Tiong et al. | |
| 2022/0176384 | A1 | 6/2022 | Thommes et al. | |

FOREIGN PATENT DOCUMENTS

| | | | |
|---|---|---|---|
| CN | 106999950 | A | 8/2017 |
| CN | 112584914 | A | 3/2021 |
| CN | 114345554 | A | 4/2022 |
| EP | 2774628 | A1 | 9/2014 |
| EP | 3488933 | A1 | 5/2019 |
| GB | 1102530 | A | 2/1968 |
| JP | H03262551 | A | 11/1991 |
| JP | H03270744 | A | 12/1991 |
| KR | 20170055348 | A | 5/2017 |
| SE | 544046 | C2 | 11/2021 |
| WO | 2020263171 | A1 | 12/2020 |

OTHER PUBLICATIONS

PCT International Search Report and Written Opinion, PCT/EP2023/079021, Jan. 17, 2024, 19 pages.

CNIPA Search Report dated May 11, 2026 for Chinese Application No. 2023800738889, 6 pages.

Communication of a Notice of Opposition, corresponding to EP 22202915.9, dated Mar. 17, 2026.

* cited by examiner

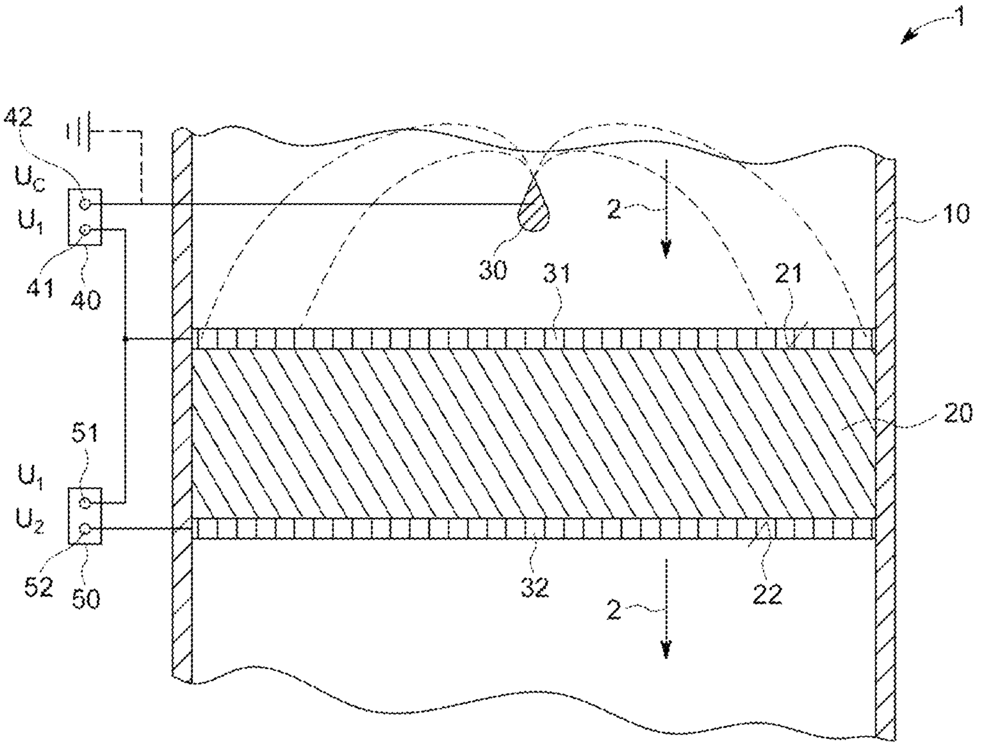
1
42
$U_C$
$U_1$
41
40
30
2
31
21
10
20
51
$U_1$
$U_2$
52
50
32
2
22

ACTIVE FIELD POLARIZED MEDIA AIR CLEANING DEVICE

CROSS-REFERENCE TO RELATED APPLICATIONS

This US Patent Application is a continuation from the International Patent Applications PCT/EP2023/079021 filed on Oct. 18, 2023 and now published as WO 2024/083928, which claims priority from and benefit of the European Patent Application No. EP 22202915.9 filed on October 2022. The disclosure of each of the above-identified patent documents is incorporated herein by reference.

FIELD OF THE INVENTION

The invention relates to passenger cabin air filters systems, or more generally to an Active Field Polarized Media Gas Cleaning Device equipped with a dielectric filter medium between a first electrode and a second electrode.

RELATED ART

Passenger cabin air filters systems remove pollutants from the ambient air and provide the cleaned air to the interior of a passenger cabin of a vehicle. Essentially the same technology may be used in other fields, e.g., for building ventilation.

Usually the term "filtration" refers to removal of particulate matter from a gas stream by a sieving the gas stream using a filter medium—the sieve. Cleaning the air based on sieving alone requires balancing between the size of the smallest particles to be held back in the sieve and the pressure drop of the sieving element—the filter medium. Removing particulate matter from a gas stream by filtration appears to be a result of a number of effects including interception, diffusion, inertial impaction. It has been suggested to improve particle removal from a gas stream using electrostatic forces by means of electret filters. The particle removal of these electret filters, however, appears to fade with increasing deposition of the fibers with particles. To address this drawback, it has been suggested to apply an external electrical field across the filter medium by locating the filter medium as a dielectric medium between two air permeable electrodes. It has been reported (see e.g., Frank Jordan, *Untersuchungen zum Partikelabscheideverhalten submikroner Partikel in Faserfiltern im elektrischen Feld*, PhD-Thesis, University Duisburg (Germany), 2001) that even non-charged submicron sized particles can be effectively removed from the gas stream using this technique. This technique is referred to as Active Field Polarized Media (AFPM) Gas Cleaning, which is to be distinguished from electrostatic precipitation and passive electrostatic filters (electret filters).

These Active Field Polarized Media Gas Cleaners usually have a gas filter housing with a receptacle for a gas filter and a high-voltage (HV) source being connected to the electrodes of the gas filter. Once the service life of the gas filter is reached, it is removed from the housing and replaced by another one. The housing hence has at least two electrical contacts for removably contacting corresponding electrical contacts of the gas filter, thereby enabling to provide an electrical connection of the gas filter with the HV-source.

U.S. Pat. No. 5,474,599 A, EP 3 488 933 A1 and EP 2774 628 A1 and US 2008/0190772 A each suggest an air cleaner having an upstream air ionizer with a set of discharge electrodes and a set of ground electrodes in between. Downstream of the air ionizer is a filter medium being in between of two further electrodes.

U.S. Pat. No. 5,549,735 suggest an Active Field Polarized Media Gas Cleaner having a two equally charged electrodes upstream of the filter medium and another electrode on the downstream side of the filter medium.

US 2007/0199450 A1 suggest an air filter having two air permeable ground electrodes and an air permeable HV electrode in between of these. Between each ground electrode and the HV electrode is a dielectric filter medium. The HV-field between the electrodes polarizes both, the particles as well as the fibers of the dielectric.

While these active field polarized media air cleaners allow to efficiently remove even sub-micron particles, air-ionization enables to sterilize air as well as to remove odors on a molecular scale. Air-ionization requires, depending on the distance of the electrode about 5 kV and typically—depending on the size of the air-ionizer—a current of a few 10 μA to 10 mA. Corona discharge gas cleaners are an example of air-ionizers. Industrial scale gas ionizer may have correspondingly larger currents.

WO2020/263171A1 suggests using a conductive filter medium of a filter cartridge as an electrode of a gas ionizer. Attached to the upstream side of the filter element are a number of isolating supports for emitter electrodes having tips pointing in the upstream direction. About 7-10 kV are provided to the emitter electrodes, while the filter medium is grounded. The voltage between the filter medium and the emitter electrodes results in a corona discharge which contributes to particle removal from a gas flow though the filter element. A power supply is directly attached to the filter cartridge and is removed with the filter cartridge when replacing the filter cartridge. The power supply may then be removed from the used filter cartridge and may be attached mechanically to a support structure of the new filter cartridge. Further, the output terminals of the power supply are to be connected via a cable with the emitter electrodes of the gas ionizer. The ground electrode is embedded in the center of the filter medium and may be e.g., an activated charcoal layer of the filter medium or a layer of carbon fibers. This ground electrode layer is contacted by pinching a needle through the plied filter medium. The needle is connected by a wire with the ground connector of the power source.

US 2003/0005824 A1 relates to dust collector and suggests to replace dust removal by corona discharge: The dust collector according to US 2003/0005824 A1 has "ion-releasing means for releasing ions without occurrence of corona discharge" and a dust collection section being downstream in a gas flow through the dust collector. By ionizing the air molecules without corona discharge, the power consumption of the dust collector as well as the Ozone generation of the dust collector is reduced.

SUMMARY OF THE INVENTION

The problem to be solved by the invention is to provide gas cleaning device that efficiently combines gas cleaning by corona discharge and Active Field Polarized Media Gas Cleaning.

Solutions of the problem are described in the independent claims. The dependent claims relate to further improvements of the invention.

A preferred example of the gas cleaning device includes at least a first filter medium. Preferably, the first filter medium is dielectric and/or non-conducting. The first filter medium may include or, alternatively, may consist of at least one layer of a plied filter paper or any other filter medium. For example, the first filter medium may include or, alternatively, may consist of at least one fibrous and/or porous filter medium. The first filter medium has a first side and a second side.

Only for simplicity, we will assume that in operation, the gas flow enters the filter medium at a first side, flows through first filter medium and exits the filter medium at a second side. In practice, the first and the second sides of the first filter medium are often, but not necessarily facing in opposite directions. In many examples, the first filter medium forms or is an integral part of a filter cartridge.

The gas cleaning device may further include a first electrode and a second electrode. The first filter medium may be at the first side and the second filter medium may be at the second side. Hence, the first side faces the first electrode and the second side faces the second electrode. In other words, the first filter medium is between the first electrode and the second electrode. Referencing to the preferred flow direction, the first electrode is upstream the first filter medium and the first filter medium is upstream of the second electrode. Hence, the first electrode and the second electrode are configured to polarize the filter medium in between to thereby enable active field polarized media gas cleaning.

A corona discharge electrode (as well corona electrode, for short) may be located at a distance from the first electrode, wherein the first electrode is in between of the corona discharge electrode and the first filter medium. This means that the corona discharge electrode may be located upstream of the first electrode. In other words, the at least one corona discharge electrode may be spaced at a distance from the filter medium at the first side of the filter medium, wherein the first electrode may be between the first filter medium and the corona discharge electrode, thereby allowing a corona discharge current between the corona discharge electrode and the first electrode. Assuming the above suggested direction of gas flow through the gas filter device, the corona discharge electrode can thus be considered to be upstream of the first filter medium. This location is not required but preferred, as it allows to remove ozone being produced by the corona discharge process to be removed by the filter medium. Hence, in a preferred example, the gas cleaning device includes (only) three electrodes, namely the corona electrode, the first electrode and the second electrode, wherein the filter medium may be located in between of the first electrode and the second electrode. The first electrode may thus be considered as a double use electrode: the corona current flows in or out of the first electrode while the voltage $U_1$ of the first electrode contributes to polarizing the filter element as will be explained below in more detail.

The corona discharge electrode may include or, alternatively, may consist of at least one emitter electrode. In practice one will mostly use a couple of emitter electrodes, but a single one may be sufficient for smaller filters. Generally, the corona discharge electrode has one or more acute ends. Examples of corona discharge electrodes have been the subject of other publications, like, e.g., the already referenced WO 2020/263171 A or the non-pre published PCT-application PCT/EP2022/071714, both of which are incorporated as if fully set forth herein or at least highly recommended to the reader.

To sum it up, three electrodes may be sufficient, the corona discharge electrode, the first electrode and the second electrode. Hence, in a preferred example, the gas cleaning device has only these three electrodes to serve the two purposes of establishing a corona discharge current and an electric field across the filter medium, i.e., there is no additional (fourth) electrode at least not in this context. The gas cleaning device thus allows to electrically connect the first electrode to a first output port of a power source wherein the first output port of the power source provides a first electrical potential $U_1$ and the corona discharge electrode to a second output port of the power source, wherein the second output port of the power source provides a corona potential $U_c$. The corresponding potential difference $U_c$-$U_1$ is herein referred to as corona voltage. Further, the first electrode may further be connected to a first output port of a voltage source and the second electrode may be electrically connected to a second output terminal of the voltage source, providing a second electrical potential $U_2$ as required to obtain Active Field Polarized Media Air Cleaning. The potential difference $U_1$-$U_2$ may hence be referred to as AFPM-voltage. By applying the AFPM-voltage across the first electrode and the second electrode, an external electrical field across the filter medium is applied which as well contributes to cleaning the gas flowing through the filter element, which is referred to as Active Field Polarized Media Gas Cleaning (AFPMGC, see above). Hence, in operation, a corona discharge current may be established between the corona discharge electrode and the first electrode and an AFPM voltage may be applied between the first electrode and the second electrode, thereby providing the electrical field for the AFPM. A gas flow through the gas cleaning device hence may be cleaned by corona discharge cleaning and as well by AFPM requiring only three electrodes. The fourth electrode according to the prior art can be omitted.

The terms power source and voltage source have been chosen only to be able to distinguish between the two different voltages providing devices while taking into account, that due to the corona discharge a current flows between the corona discharge electrode and the first electrode and that hence the power source indeed has to supply electrical power, whereas in an idealized picture the voltage source, once the capacitor, being formed by the first electrode, the first filter element and the second electrode, has been charged could be disconnected and hence provides no power. In the real world, however the voltage source compensates for (unintended) voltage losses and hence provides only essentially no power.

The gas cleaning device as explained above thus allows to use the first electrode for two purposes (at the same time, i.e. simultaneously), namely as an electrode in the corona discharge circuits and as well as an electrode of the active field polarized filter media. This double use of the first electrode provides a number of advantages. For example, it allows a very compact gas cleaning device, which frees space which can be added to the passenger cabin without increasing the volume of the vehicle. In many, cases vehicles with passenger cabins have cabin air cleaning devices under their hood. The size of the cabin air cleaning devices imposes constraints on the aerodynamics of the vehicle. Due to the size reduction being provided by the invention, these limitations are shifted, and aerodynamically improved hood design are possible. The invention hence contributes to reduced energy consumption of the vehicle. Alternatively, one may maintain the size constant but increase the surface of the filter media, which allows to increase the service life if the filter medium or media, as the case may be.

For example, a first output terminal of the power source and a first output terminal of the voltage source may be electrically connected to the first electrode. The corresponding voltage level of the first electrode ($U_1$) may be considered as the ground potential (which may but does not need to be the same ground potential as defined by a non-charged electrode). The electrical potential (measured in volt) of the corona discharge electrode $U_c$ and that of the second electrode $U_2$ may be both above the first potential $U_1$ or both below the first potential $U_1$, or the second potential $U_2$ may be above ground potential while the corona discharge electrode's potential $U_c$ is below $U_1$. In another example, the second potential $U_2$ may be below the first potential $U_1$ while the corona discharge electrode's potential $U_c$ is above the first potential $U_1$. Preferably, the electrical potential of the second electrode $U_2$ and the electrical potential of the corona discharge electrode $U_c$ are at electrical potentials of opposite signs relative to that of the electrical potential of first electrode $U_1$. In a preferred example, the corona discharge electrode is grounded ($U_c=0$). In this case there is no high voltage at the inlet of the gas cleaning device that might harm persons or cause other issues. In another example, the first electrode may be grounded. In practice, this means that the first voltage source and the second voltage source share a common ground terminal, rendering the design of the power source and the voltage source particularly simple.

The corona discharge current implies that there is a gap or void in between of the corona discharge electrode and the first electrode. During operation, the gap is filled by the gas being cleaned. Only to distinguish this gap linguistically from other gaps, we refer to the gap between the corona discharge electrode and the first electrode as "corona gap" or "corona discharge gap". There may be an isolating spacer or other kind of support structure mechanically supporting the corona discharge electrode and the first electrode relative to each other to thereby define the corona discharge gap but generally there is a gas flow path between the corona discharge electrode and the first electrode and from there through the first filter medium.

There may be another gap (the so called first gap) between the first electrode and the first filter element, but this is not required. The first electrode may as well be directly attached to the first side of the first filter medium and/or penetrate the first filter medium.

The first electrode may be gas permeable to allow a gas flow through the first electrode via the optional first gap and through the first side of the first filter medium into the first filter medium.

In a preferred example, the first electrode and/or the second electrode are each/is a conductive sheet or layer covering the first side and/or second side, respectively, of the first filter medium. As apparent in this case the layer and/or sheet, respectively should be gas transmissive (or cover only a portion of the respective side of the first filter medium). Preferably, at least one of the first electrode and the second electrode consists of or, alternatively, includes a charcoal filter layer. Particularly preferred is the situation when the second electrode includes or, alternatively, consists of a charcoal filter layer, while the first electrode is made of a material having a lower specific resistivity than charcoal. In any case, a charcoal filter layer, preferably, consists of or—alternatively—includes activated charcoal. The charcoal layer further contributes to a cost reduction, as it is conductive (and may thus serve as an electrode) and at the same time is an efficient adsorbent not only for volatile organic compounds or mercury (Hg), but as well for ozone ($O_3$). Ozone is produced by the Corona Air Cleaning and has to be removed from the air stream prior to releasing the cleaned air to avoid exposing humans or animals to increased ozone levels. Using a charcoal layer as first electrode and/or second electrode hence avoids using a metal electrode which would render disposal of the gas filter device more expensive, as metal needs to be recycled, whereas a metal free filter cartridge with the first filter medium and at least one charcoal layer can be disposed with the usual municipal waste, being mostly fired or disposed as landfill.

As already explained, at least one of the first electrode and/or the second electrode may be attached to the first filter medium and serve itself as a filter layer, like e.g. the already discusses charcoal layer.

For example, the first electrode and/or the second electrode may be filters layers being laminated to the first filter medium. Thereby, the filter characteristics can be enhanced, while reducing the volume and the mass of the gas cleaning device, which allows to optimize a vehicle as set out above and as well reduces manufacturing costs. As apparent, the first and the second electrodes are preferably at least essentially parallel to each other and/or of have an at least essentially constant distance to each other (e.g., constant within at least ±15%, ±10%, ±5%, ±2.5%, ±1% of the mean distance). As second filter element may be downstream of the first filter layer in between of the second side of the first filter element and the second electrode. In an example, the filter medium may be a pleated filter medium. In a preferred example, first at least one of the first electrode and the second electrode is applied a non-pleated filter medium and subsequently the filter medium with the at least one of the first electrode and the second electrode is pleated. Preferably, both electrodes are applied to the filter medium prior to the pleating step.

Alternatively or in addition, a second or third, respectively filter element may be downstream of second electrode, whereas "downstream" means at the side of the second electrode that faces away from the first filter element (assuming the filter elements to be aligned in series in a straight gas channel).

Alternatively or in addition, a second or third or fourth filter element may be located upstream of the corona discharge electrode, wherein upstream means at the side of the corona discharge electrode that faces away from the first electrode.

It is noted that a filter medium can, but does not have to include a single layer of a single filter material. A filter medium can as well be or include multiple layers of the same or of different filter materials.

BRIEF DESCRIPTION OF THE DRAWINGS

In the following, the invention will be described by way of example, without limitation of the general inventive concept, on examples of embodiment with reference to the drawings.

FIG. 1 shows a sectional view of a simplified gas filter device.

DETAILED DESCRIPTION OF THE INVENTION

In reference to FIG. 1, the gas filter device 1 includes a first filter medium 20. The first filter medium 20 may be accommodated in a filter housing 10. The first filter medium 20 has a first side 21 and a second side 22 and is at least essentially non-conductive. In a preferred example, the first filter medium is a dielectric.

The preferred gas flow direction during operation of the gas filter device 1 is indicated by an arrow 2. Thus, the first side 21 can be considered as an upstream side and the second side 22 may be considered as a downstream side of the filter element. In the depicted example, the filter element 20 has a box shape, but in a preferred example it is or includes a pleated filter medium like, e.g., some fabric or paper filter.

At or on the first side 21 of the first filter medium 20 may be a first electrode 31. At or on the second side 22 of the first filter medium 20 may be a second electrode 32. Like in the depicted example, the first filter medium 20 may be sandwiched between the first electrode 31 and the second electrode 32. Further, the first electrode 31 and the second electrode 32 may span over or cover at least essentially the entire first side 21 or the entire second side 22, respectively. At least essentially the entire first side 21 or second side 22 shall be understood as to span or over at least one of 85%, 90%, 95%, 97.5%, 99% or 100% of the respective surface. The first electrode 31 and the second electrode 32 are, preferably, made of a gas transmissive material and of have through holes allowing for the indicated gas flow 2.

As shown in the depicted example, the second electrode 32 may include a layer of activated charcoal.

Upstream of the first electrode is a corona discharge electrode 30. During operation a corona discharge of the gas flowing as indicated by the arrow 2 occurs and a corona discharge current flows between the corona discharge electrode 30 and the first electrode 31 (indicated by dashed curved lines extended from the corona discharge electrode 30 to the first electrode 31).

It should be noted that other filter media and shapes may be used as well. Here we selected the box shape, only to ease visualization of the general relative positions of the first electrode 31 and of the second electrode 32 relative to the first filter element 20 and relative to the corona discharge electrode 30.

As can be seen in FIG. 1, the first electrode 31 may be electrically connected to both, a first output port 41 of a power source 40 and to the first output 51 of a voltage source 50. The corona discharge electrode 30 may be electrically connected to a second output port 42 of the power source 40 and the second electrode 32 may be electrically connected to a second output 52 port of the voltage source 50.

There are two preferred modes of operation: In a first mode of operation, the corona discharge electrode 30 is grounded (indicated by a dashed connection). In a second mode of operation, the first electrode 31 is grounded. But the ground potential may as well be the potential of the second electrode or any other potential. The power source 40 and the voltage source 50 are depicted as separate devices. Of course, they can be integrated into a single device.

In a preferred example, the first electrode 31 is positive relative to the corona discharge electrode 30 ($U_c<U_1$). Further, it is preferred that the second potential $U_2$, i.e. the electrical potential $U_2$ of the second electrode 22 is, preferably, below the first potential $U_1$. In other words, preferably $U_c<U_1$ and/or $U_2<U_1$.

LIST OF REFERENCE NUMERALS

1 gas cleaning device
2 preferred/assumed flow direction
10 housing/channel
20 first filter medium
21 first side of first filter medium
22 second side of first filter medium
30 corona discharge electrode
31 first electrode
32 second electrode
40 power source
41 first output port of the power source
42 corona discharge port/first output port of the power source
50 voltage source
51 first output port of the voltage source
52 first output port of the voltage source
$U_1$ first potential (electrical potential at the first electrode)
$U_2$ second potential (electrical potential at the second electrode)
$U_c$ corona potential (electrical potential at the corona discharge electrode)
$U_c$-$U_1$ corona voltage (potential difference between the first electrode and the corona discharge electrode)
$U_2$-$U_1$ active polarized media voltage (potential difference between the first electrode and the second electrode)

What is claimed:

1. An active field polarized media gas cleaning device comprising at least:

a first electrode and a second electrode, a first filter medium with a first side and a second side, wherein the first side faces the first electrode and the second side faces the second electrode, a corona discharge electrode located at a distance from the first electrode, wherein the first electrode is located between the corona discharge electrode and the first filter medium and has an electrically conductive surface exposed to air and facing the corona discharge electrode to discharge electrically charged particles arriving from the corona discharge electrode at said electrically conductive surface, a power source providing electrical power, wherein the first electrode is connected to a first output port of the power source, wherein the first output port of the power source is configured to provide a first electrical potential $U_1$ to the first electrode, wherein the corona discharge electrode is connected to a second output port of the power source, wherein the second output port of the power source provides a corona potential $U_c$, wherein a corresponding potential difference ($U_c$-$U_1$) is a corona voltage and a corona discharge circuit includes the corona discharge electrode and the first electrode, wherein the active field polarized media gas cleaning device is configured to apply a potential difference ($U_1$-$U_2$) across the first electrode and the second electrode to obtain active field polarized media air cleaning, wherein $U_2$ is a second electrical potential of the second electrode, wherein both the first electrode and the second electrode are directly attached to the first filter medium, wherein the active field polarized media gas cleaning device has no more electrodes than the first electrode, the second electrode, and the corona discharge electrode and is configured to use the first electrode simultaneously as an electrode in the corona discharge circuit and an electrode of the first filter medium.

2. The gas cleaning device according to claim 1, comprising a corona gap between the corona discharge electrode and the first electrode, wherein the corona gap is configured to permit a corona-discharge current between the corona discharge electrode and the first electrode.

3. The gas cleaning device according to claim 1, wherein:

(i) the first electrode is electrically connected to a first output port of a voltage source, and/or (ii) the second electrode is connected to a second output terminal of the voltage source.

4. The gas cleaning device according to claim 1, wherein each of the second electrode and the corona discharge electrode is at electrical potential of opposite sign relative to the electrical potential of the first electrode.

5. The gas cleaning device according to claim 1, wherein the corona discharge electrode is grounded or the second electrode is grounded.

6. The gas cleaning device according to claim 4, further comprising a voltage source, wherein the first electrode is grounded, whereby the voltage source and the power source share a common ground terminal.

7. The gas cleaning device according to claim 1, wherein the corona discharge electrode and the second electrode are at different electrical potentials.

8. The gas cleaning device according to claim 1, wherein at least one of the first electrode and the second electrode includes a charcoal layer.

9. The gas cleaning device according to claim 1, further comprising a voltage source, wherein the first electrode is grounded, whereby the voltage source and the power source share a common ground terminal.

10. The gas cleaning device according to claim 4, wherein the corona discharge electrode and the second electrode are at different electrical potentials.

11. The gas cleaning device according to claim 1, wherein the corona discharge electrode is grounded or the second electrode is grounded.

12. The gas cleaning device according to claim 1, wherein the corona discharge circuit is configured to discharge the electrically charged particles arriving from the corona discharge electrode at said electrically conductive electrode surface of the first electrode.

13. An active field polarized media gas cleaning device comprising at least:

a first electrode and a second electrode, a first filter medium with a first side and a second side, wherein the first side faces the first electrode and the second side faces the second electrode, a corona discharge electrode located at a distance from the first electrode, wherein the first electrode is located between the corona discharge electrode and the first filter medium and has an electrically conductive surface exposed to air and facing the corona discharge electrode to discharge electrically charged particles arriving from the corona discharge electrode at the first electrode, a power source providing electrical power with a first output port and a second output port, wherein the first electrode is connected to the first output port of the power source, wherein the first output port of the power source is configured to provide a first electrical potential $U_1$ to the first electrode and the corona discharge electrode is connected to the second output port of the power source, wherein the second output port of the power source is configured to provide a corona potential $U_c$, wherein a corresponding potential difference $(U_c-U_1)$ is a corona voltage and the corona discharge electrode and the first electrode are part of a corona discharge circuit, wherein the active field polarized media gas cleaning device is configured to apply a potential difference $(U_1-U_2)$ across the first electrode and the second electrode to obtain active field polarized media air cleaning, wherein $U_2$ is a second electrical potential of the second electrode, wherein the active field polarized media gas cleaning device has no more electrodes than the first electrode, the second electrode, and the corona discharge electrode and wherein the active field polarized media gas cleaning device is configured to use the first electrode simultaneously as an electrode in the corona discharge circuit and an electrode of the first filter medium, wherein the active field polarized media gas cleaning device is configured to establish, in operation, a corona discharge current from the corona discharge electrode to the electrically conductive surface of the first electrode.

14. The gas cleaning device according to claim 12, comprising a corona gap between the corona discharge electrode and the first electrode, wherein the corona gap is configured to permit a corona-discharge current between the corona discharge electrode and the first electrode.

15. The gas cleaning device according to claim 12, wherein:

(i) the first electrode is electrically connected to a first output port of a voltage source, and/or (ii) the second electrode is connected to a second output terminal of the voltage source.

16. The gas cleaning device according to claim 12, wherein each of the second electrode and the corona discharge electrode is at electrical potential of opposite sign relative to the electrical potential of the first electrode.

17. The gas cleaning device according to claim 12, wherein each of the first electrode and the second electrode is directly attached to the first filter medium.

18. The gas cleaning device according to claim 12, wherein at least one of the first electrode and the second electrode is a filter layer laminated to the filter medium.

19. The gas cleaning device according to claim 15, further comprising a voltage source, wherein the first electrode is grounded, whereby the voltage source and the power source share a common ground terminal.

20. An active field polarized media gas cleaning device comprising at least:

a first electrode and a second electrode, a first filter medium with a first side and a second side, wherein the first side faces the first electrode and the second side faces the second electrode, a corona discharge electrode located at a distance from the first electrode, wherein the first electrode is located between the corona discharge electrode and the first filter medium and has an electrically conductive electrode surface exposed to air and facing the corona discharge electrode to discharge electrically charged particles arriving from the corona discharge electrode at the first electrode, a power source providing electrical power with a first output port and a second output port, wherein the first electrode is connected to the first output port of the power source, wherein the first output port of the power source is configured to provide a first electrical potential $U_1$ to the first electrode and the corona discharge electrode is connected to the second output port of the power source, wherein the second output port of the power source is configured to provide a corona potential $U_c$, wherein a corresponding potential difference $(U_c-U_1)$ is a corona voltage and the corona discharge electrode and the first electrode are part of a corona discharge circuit discharging the electrically charged particles arriving from the corona discharge electrode at said electrically conductive electrode surface of the first electrode, wherein the active field polarized media gas cleaning device is configured to apply a potential difference ($U_1$-$U_2$) across the first electrode and the second electrode to obtain active field polarized media air cleaning, wherein $U_2$ is a second electrical potential of the second electrode, and wherein the active field polarized media gas cleaning device has no more electrodes than the first electrode, the second electrode, and the corona discharge electrode and wherein the active field polarized media gas cleaning device is configured to use the first electrode simultaneously as an electrode in the corona discharge circuit and an electrode of the first filter medium.

* * * * *